(12) United States Patent
Jain

(10) Patent No.: US 11,922,517 B2
(45) Date of Patent: Mar. 5, 2024

(54) SYSTEM AND METHOD FOR ALLOCATION, MANAGEMENT AND PEER REVIEW BASED TRANSFER OF ELECTRONIC TOKENS

(71) Applicant: Kamal Kant Jain, Uttar Pradesh (IN)

(72) Inventor: Kamal Kant Jain, Uttar Pradesh (IN)

( * ) Notice: Subject to any disclaimer, the term of this patent is extended or adjusted under 35 U.S.C. 154(b) by 841 days.

(21) Appl. No.: 16/346,702

(22) PCT Filed: Sep. 27, 2017

(86) PCT No.: PCT/IN2017/050429
§ 371 (c)(1),
(2) Date: May 1, 2019

(87) PCT Pub. No.: WO2018/083712
PCT Pub. Date: May 11, 2018

(65) Prior Publication Data
US 2020/0074566 A1  Mar. 5, 2020

(30) Foreign Application Priority Data

Nov. 4, 2016 (IN) .............................. 201611037695

(51) Int. Cl.
*G06Q 50/00* (2012.01)
*G06Q 20/36* (2012.01)
*H04L 9/40* (2022.01)

(52) U.S. Cl.
CPC .......... *G06Q 50/01* (2013.01); *G06Q 20/367* (2013.01); *H04L 63/0876* (2013.01)

(58) Field of Classification Search
CPC ............................ G06Q 50/01; G06Q 30/0279
See application file for complete search history.

(56) References Cited

U.S. PATENT DOCUMENTS

| 8,452,772 | B1* | 5/2013 | Carpio | G06F 16/285 |
| | | | | 707/738 |
| 9,424,612 | B1* | 8/2016 | Bright | G06F 16/9535 |
| 2009/0132271 | A1 | 5/2009 | Typaldos | |
| 2012/0271759 | A1* | 10/2012 | Lee | G06Q 30/02 |
| | | | | 705/35 |
| 2012/0303702 | A1* | 11/2012 | Richter | G06Q 50/01 |
| | | | | 709/204 |
| 2015/0310568 | A1* | 10/2015 | Sadeghpour | G06Q 50/01 |
| | | | | 705/14.19 |
| 2016/0148324 | A1* | 5/2016 | Perez | H04L 67/02 |
| | | | | 705/14.31 |

FOREIGN PATENT DOCUMENTS

WO    WO-2010151626 A1 * 12/2010 ......... G06Q 20/3672

OTHER PUBLICATIONS

Yu-Kwong Ricky Kwok, Vincent K.N. Lau, "Incentives in PeertoPeer Computing", in Wiley-IEEE Press 2007, pp. 663-695, Jan. 2007, doi: https://doi.org/10.1002/9780470167960.ch28 (Year: 2007).*
International Search Report from PCT Application No. PCT/IN2017/050429, dated Jan. 3, 2018.

* cited by examiner

*Primary Examiner* — Lynda Jasmin
*Assistant Examiner* — Ehrin L Pratt

(57) ABSTRACT

The invention provides methods, systems and computer program products for implementing social networks that provide for reliable verification and validation of user content. In an embodiment, the invention enables implementation of social networks that enable recordation and validation of social contributions of members.

5 Claims, 10 Drawing Sheets

SYSTEM AND METHOD FOR ALLOCATION, MANAGEMENT AND PEER REVIEW BASED TRANSFER OF ELECTRONIC TOKENS

CROSS-REFERENCE TO RELATED APPLICATIONS

The present application is a National Stage Application under 35 U.S.C. § 371 of PCT Application No. PCT/IN2017/050429, filed Sep. 27, 2017, which claims priority from Indian patent application number 201611037695, filed on Apr. 11, 2016, the complete disclosures disclosure of which are hereby incorporated by reference.

TECHNICAL FIELD

The present subject matter described herein, in general, relates to the field of social networks, and in particular to a social network that enables allocation, management and peer review based transfer of electronic tokens.

BACKGROUND

Social networks typically focus on connecting individuals and providing a platform for expression. While social networks typically enable some form of peer feedback and/or peer approval by allowing members and friends to "like" a post, or to use emoticons to express approval or disapproval of a task.

Existing social networks suffer from certain fundamental drawbacks. A first drawback is that while such networks promote and encourage expression on the part of members, they fail to provide mechanisms for validating or verifying the genuineness of member generated content. In absence of any mechanisms for verifying member generated content, content on such social networks are found to be poorly suited for real world application of such data.

Additionally, it has been found that peer review of content is inherently unreliable, as motivations for individual peer reviews are difficult to assess—which results in low confidence associated with such reviews.

There is accordingly a need for social networks that ensure validation or verification of content, and for scoring confidence in such content—for enabling third party reliance on such content. There is additionally a need for social networks that can be configured to record social contributions of members, and to enable validation or verification of social contributions asserted by members.

It has further been found that work such as household labor, care giving and civic and socially driven activities make up a non-monetary economy that may or may not have associated monetary value, but which is driven by voluntary efforts without any monetary consideration—and which remains a vitally important part of the economy and society. With respect to the current economic situation, labor that results in monetary compensation becomes more highly valued than unpaid labor. The non-monetary economy seeks to reward and value work that benefits society that the monetary economy does not recognize.

At present, there is only one type of currency available in the market i.e. for purchasing goods and services. However, there is no currency for measuring the contribution of a person towards the society without any commercial or materialistic interest. Presently, deeds and work in any voluntary field or work for society as a whole or for any social cause is not rewarded or is insufficiently rewarded in the form of traditional currencies. Further, the reward (if any) is disproportionately small in comparison with the contribution made to society. While government or non-government organizations do give rewards for contribution to the society by individuals or nonprofit organizations, deserving people still go unrewarded.

It is therefore a necessity to start rewarding people for social work or for work done for the collective good.

Additionally, while accumulation of traditional currencies are directly related to social standing and respect in society, there is a need for mechanisms that reward selfless activities or social activities.

The proposed invented platform/scheme discussed hereunder, helps in recognizing and promoting deserving individuals in society and connecting people who need assistance or support in any form with people who are capable of fulfilling their needs/requirements. The invention also helps to highlight causes that need immediate attention—for example, causes involving natural disasters, calamities, loss of human or animal life, and social welfare in general.

SUMMARY

The present invention comprises a system for peer review based transfer of electronic tokens within a social network, the system comprising (i) a processor implemented social network comprising at least one database configured to maintain electronic accounts corresponding to members of said social network; (ii) at least one database configured to maintain records of electronic tokens associated with one or more electronic accounts corresponding to members of said social network, wherein the social network is implemented over a communication network and is configured for maintaining a first type electronic token account and a second type electronic token account corresponding to each of a plurality of social network members, wherein (a) the first type electronic token account records a number of units of a first type electronic token associated with the corresponding member, (b) the second type electronic token account records a number of units of a second type electronic token associated with the corresponding member, (c) each first type electronic token account corresponding to the plurality of social network members is allocated a fixed number of units of the first type electronic token on a periodic basis, said allocated units of said first type electronic token having a defined expiry period, (d) each second type electronic token account corresponding to the plurality of social network members is configured to maintain a non-transferable and perpetual record of second type electronic tokens received into said second type electronic token account, and (e) units of second type electronic tokens are credited into a second type electronic token account associated with a first member in response to receiving an instruction for transfer of units of first type electronic tokens from a first type electronic token account associated with a second member, wherein (i) the credited number of units of second type electronic tokens is based on a predefined set of conversion rules, and (ii) the transferred units of the first type electronic tokens are debited from the first type electronic account associated with the second member.

The invention further comprises a system for processing and measuring non-monetary contributions comprising (i) a processor, wherein the processor is configured to communicate with user devices via a data communication channel, and (ii) a memory coupled with the processor, wherein the processor is configured to execute programmed instructions stored in the memory for (a) registering, one or more user with user device, (b) authenticating, user with user device by unique identification number, (c) initializing, predefined parameters for transaction, wherein the parameters are related to non-monetary social contribution of user with user device in the society, (d) issuing, transaction points for registered users, (e) initiating, transaction of points on verification of parametric conditions defined with the help of donation module, (f) processing, the points received by user with user device, (g) measuring, the points received by user with user device, and (h) identifying, the user with device receiving maximum quantity of points.

In an embodiment of the system, the unique identification number comprises an unique government issued identifier (for example, the Aadhaar number/UIDAI number issued by the Government of India) or like unique identification number.

In another embodiment, parameters comprises individual's non-monetary contribution in natural calamities, accidents, poverty and slums, disabled people, health conditions, orphans, old age people, science, sports, Arts, commerce, industry, animals, labour, victims and such parameters of situations.

The invention also comprises a method for implementing a peer review based transfer of electronic tokens within a social network, the method comprising (i) maintaining a first type electronic token account and a second type electronic token account corresponding to each of a plurality of members of the social network, wherein (a) the first type electronic token account records a number of units of a first type electronic token associated with the corresponding member, (b) the second type electronic token account records a number of units of a second type electronic token associated with the corresponding member, (c) each first type electronic token account corresponding to the plurality of social network members is allocated a fixed number of units of the first type electronic token on a periodic basis, said allocated units of said first type electronic token having a defined expiry period, (d) each second type electronic token account corresponding to the plurality of social network members is configured to maintain a non-transferable and perpetual record of second type electronic tokens received into said second type electronic token account, and (e) units of second type electronic tokens are credited into a second type electronic token account associated with a first member in response to receiving an instruction for transfer of units of first type electronic tokens from a first type electronic token account associated with a second member, wherein (i) the credited number of units of second type electronic tokens is based on a predefined set of conversion rules, and (ii) the transferred units of the first type electronic tokens are debited from the first type electronic account associated with the second member.

The invention further comprises a method for processing and measuring non-monetary contributions comprising (i) registering via a processor, one or more user with user device, (ii) authenticating via the processor, user with user device by unique identification number, (iii) initializing via the processor, predefined parameters for transaction, wherein the parameters are related to non-monetary social contribution of user with user device in the society, (iv) issuing via the processor, transaction points for registered users, (v) initiating via the processor, transaction of points on verification of parametric conditions defined with the help of donation module, (vi) processing via the processor, the points received by user with user device, (vii) measuring via the processor, the points received by user with user device, and (viii) identifying via the processor, the user with device receiving maximum quantity of points under different categories.

In an embodiment of the method, every user with user device comprises corresponding unique identification number.

In another embodiment, the points are non-monetary points.

In a further embodiment, the points are issued to every registered user in predefined quantity for predefined time interval.

In yet another embodiment of the method, verification of parametric conditions is performed by identifying the posts posted on the GUI of the system.

In an embodiment, the points may lapse after a predefined time interval if not used.

In an embodiment of the method, the registration comprises third party registration depending on whether the user is registered with one or more social website or computer implemented platform.

In a method embodiment, predefined parameters comprises content specific data of social activities being carried out in the society.

In a further method embodiment, content specific data may be promoted by the system on receiving inputs from user device in the form of text, images, videos or any multimedia format acceptable by the system.

In yet another method embodiment, content specific data may be promoted by the system with the help of virtual bots wherein, the bots are generated through machine learning wherein patterns of said content is derived and further said patterns are processed in order to match the outputs with the format available on internet;

and wherein, the system is further configured to release said virtual bots in order to collect information, data, content related to social activities done by people and shared on various forums, e-newspapers, or such similar social networks/portals wherein, said content of social activities is not available on system.

In a system embodiment, one or both of the first and second type electronic tokens comprise tokens of a social currency.

In a method embodiment, one or both of the first and second type electronic tokens comprise tokens of a social currency.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
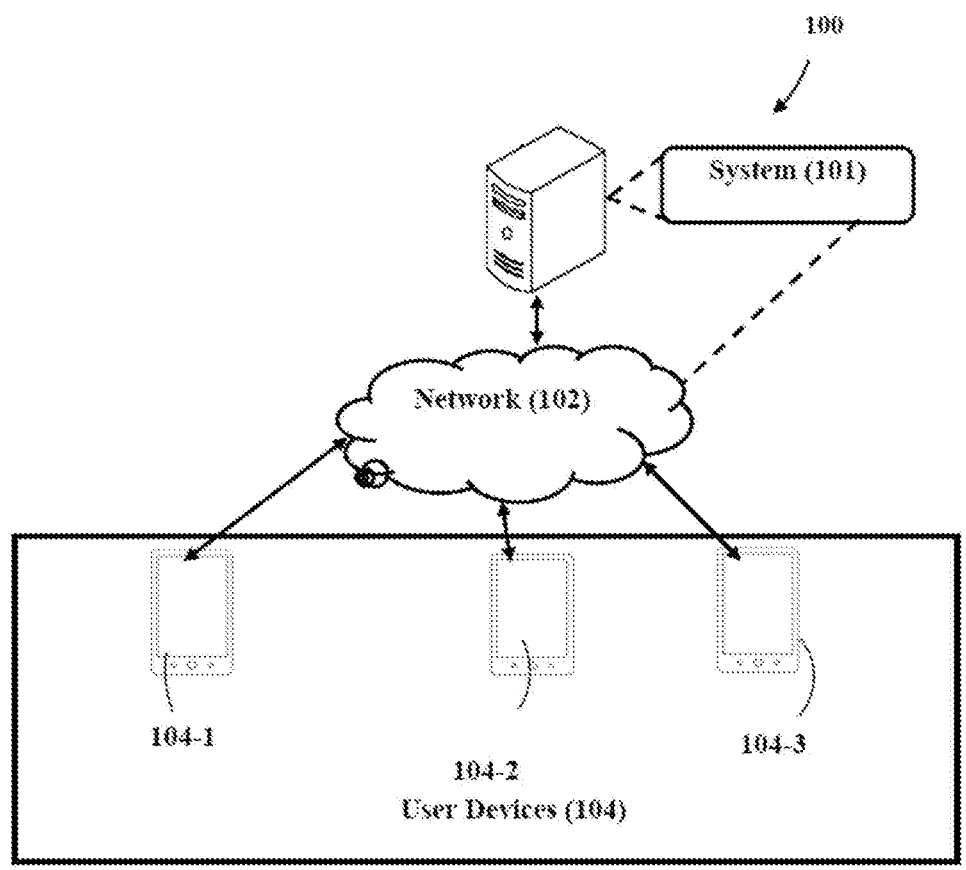
FIG. 1 illustrates, an implementation 100 of a system 101 for processing and measuring non-monetary contributions

The present invention provides methods, systems and computer program products for implementing social networks that provide for reliable verification and validation of user content. In a particular embodiment, the invention enables implementation of social networks that enable recordation and validation of social contributions of members.

As will be discussed in detail hereinbelow, the present invention relies on controlled generation and distribution of two different types of electronic tokens to members of the social network, wherein the permissions or controls associated with generation and distribution of said electronic tokens are implemented so as to enable verification and validation of user generated content on the social network.

In brief, the invention achieves its multiple objectives through implementation and control of an electronic token system based on a first type electronic token and a second type electronic token—each type of electronic token having different token characteristics. Each member of a social network is additionally provided with a first type electronic token account and a second type electronic token account for respectively storing units of the first type electronic token and the second type electronic token that are associated with said member.

The first type electronic token is an electronic token that is allocated in equal units to all members of the social network on a periodic basis, wherein each allocated unit of said first type electronic token has an identical defined validity period commencing from the date of allocation. On a periodic basis, every member of the social network is allocated an equal amount of said first type electronic token—with a predefined set of rules governing the manner in which said first type electronic token may be used. The units of the first type electronic token that are allocated to a member of the social network are credited to the first type electronic token account associated with said member for the validity period of said electronic token. Upon expiry of said validity period, any unspent units of the first type electronic tokens in a first type electronic token account ceases to have value, and such expired units of electronic tokens of the first type are debited from said member's first type electronic token account.

The second type electronic token may, in an embodiment, be generated through conversion from the first type electronic token. In an embodiment, a unit of the second type electronic token is generated when a first member of the social network transfers or donates a unit of the first type electronic token to a second member of the social network. Through said process of transfer, (i) the unit of the first type electronic token is debited from a first type electronic token account associated with the transferor, (ii) is converted to an equivalent unit of the second type electronic token, and (iii) is thereafter credited to a second type electronic token account that is associated with the transferee. The transferred unit(s) of the first type electronic token is simultaneously debited from the first type electronic token account associated with the transferor. The second type electronic token may have a predefined set of rules associated with its generation, storage and disposal. In an embodiment, once deposited in a second type electronic token account associated with a transferee, the deposited second type electronic token is non-transferable, and remains valid and associated with the second type electronic token account of the transferee for the lifetime of the member's social network account.

The generation and credit of units of the second type electronic token to an account of a second member in response to donation or transfer of corresponding units of the first type of electronic tokens from a first member of the social network creates a tool for peer review and peer approval of content posted by members of the social network. The number of units of the second type of electronic token associated with a member's account provides a reliable method for assessing the number of tokens transferred to such member from peer members. In view that each member has a limited number of electronic tokens of the first type, the social network ensures that the number of units of the second type of electronic tokens associated with any member's account is a realistic reflection of peer approval across the social network.

Since units of the second type of electronic token can only be associated with an account of a member through a transfer or donation mechanism from another member (wherein a donating member transfers units of the first type of electronic tokens to a second member by converting units of the first type of electronic tokens into units of the second type of electronic tokens), the number of units of the second type of electronic token that is associated with the account of a particular member provides a reliable and accurate indicator of peer approval (across the social network) of tasks undertaken or posts made by a particular member of the social network. Additionally, since each member of the network has a limited supply of units of the first type of electronic tokens, and since any unspent tokens of the first type, expire or cease to have value at the end of their validity period, the social network enforces a supply limitation in respect of both the first and second type of electronic tokens—which limits the units of electronic tokens of the second type that any member may receive by way of donation or transfer from any other member at a given time, and which further ensures that any donations or transfers made from one member to another, are donations or transfers made pursuant to deliberation and specific intent on the part of the donor/transferor member.

In a specific embodiment of the invention, the social network may be configured to enable members to initiate transfer or donation of electronic tokens to other members in connection with a specific post or activity recorded by said other members through said social network. In a more specific embodiment, the social network maintains a record of second type electronic tokens received by each member, and also the specific activity or post for which such second type electronic tokens were received. In a yet more specific embodiment, the social network is configured to enable retrieval of records related to second type electronic tokens received by each member, and additionally to filter the units of received second type electronic tokens according to one or more associated parameters, including any of date of transfer, transferor member, activity or post associated with such transfer etc.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

In an embodiment, the invention is directed towards implementing a social currency parallel to the existing/traditional currencies for measuring non-monetary or social contribution of members. Under this new currency system every person above a certain age or within an organization shall be given system generated points electronically which can be transferred to others who have contributed to a cause or to an activity that is registered on the system on the basis of any unique identification (i.e. Aadhaar number, voter ID, PAN number, Mobile Number, User ID, Login via social networking etc.) and will be given a fixed amount of points (say 1,000 equal points) after a fixed tenure. Every person who is provided the points at the time of registration by becoming a member at the system would be free to give his or her points to anyone they feel is doing good work or promoting the welfare of any living being and on basis of socially acceptable norms, however, if the points provided at the time of registration is not used within the fixed tenure, all these points will lapse as the basic purpose of providing social points is to share these points with others to convert these into social currency. A record should be maintained of this currency in the system.

The system would maintain records under two headings, wherein one of the heading would contain the points received that can be used for transferring. Another head would contain the number of reward points a member has received or accumulated from others in his life.

The individuals who are registered with the system may post their work or others work for social purposes or outstanding performance in any field in the system which may be verified by few other persons/organizations who might or might not be related to the person/organization who has done the work. The work can also be posted directly on the basis of any certificate issued by other organization, NGO etc. By enabling a member to post on the basis of certificates issued by other organizations, the social network enables a convenient form of self-validation of the contents of the post. The network may additionally be configured to enable uploading of the certificate issued by such other organization for the purpose of validation and/or verification.

In specific embodiments, bots may be configured to extract information regarding occurrences, events or social causes that are not associated with members of the social network, and to post such information on the network, to enable members to provide assistance as necessary. In an embodiment, obtaining and posting information may include ascertaining geo-tag information associated with such events, occurrences or social causes so that members in the vicinity can respond.

In an embodiment of the invention, members may transfer or donate units of the first type of electronic token to a specific post that has been posted on the social network—despite such post not having been made by a member (for example, in the case of a post based on information extracted and linked by a bot). In such cases, the transferred or donated units of the first type of electronic token may be converted to units of the second type of electronic token and linked or associated with the specific post itself. In a more specific embodiment, the social network may permit for the units of the second type of electronic token that have been linked or associated with a specific post, to be subsequently (for example at a later date) credited to a second electronic token account associated with a social network member, wherein said social network member has been determined to be responsible for the information or activity described in said post.

In a particular embodiment, the social network may be configured to alert members located in the geographical vicinity of an event, occurrence or social cause, so that such members may respond appropriately. In another embodiment, the social network may be configured to ascertain the veracity of a member's posts by comparing the location of activities referred to in the post with GPS location information received from a mobile communication device associated with the member (e.g. from a registered mobile phone device of the member).

In another embodiment, the social network may be configured so as to provide a verification counter associated with each member post or with any information or data provided by a member. The social network may be configured to allow members other than the posting member to provide input representing their individual verification or validation of the information provided by the posting member—wherein receiving said input results in incrementing the verification counter by a predefined value. The verification counter may be visible or accessible to all members of the social network—thereby enabling other members to ascertain whether the information or data posted by a member has been independently verified or validated by third parties, and to additionally the assess the number of third parties that have verified or validated said information.
Effect of Social Currency on Income Disparity After a certain limit of accumulation of wealth, every person seeks social recognition, prestige and definitely the social points received by him helps him to achieve that. It will also increase the morale in them and motivate them to work hard for the society.
Relationship Between Money and Social Status Social points can also be very valuable as it can provide social status (prestige) to people for doing good jobs like helping the needy. This may not be a perfect solution to stop the greed of men but his greed can be used to do good work for the society. This will be an important step on the path to promote love and equanimity.
Possible Uses and Advantages of Social Currency Under special circumstances and after assessing the real need of a person and his contribution towards society, he/she may be granted a reward in the form of traditional/financial currency at a pre-determined value.

In addition to the merit of the civil/criminal cases to settle dispute/cases, the social points received by the person can also be considered.

The social status of a person should be determined by taking into account both Social points and traditional money.

The Social points can be linked to any unique government issued identifier (for example, the Aadhaar number/UIDAI number issued by the Government of India) or other unique identifier. Subsidies and a lot of other schemes, discounts, pension, life/health insurance etc. can be associated with this currency. Social points received will become a social currency which will distribute the importance of financial currency.

This is helpful for democracy. We vote only once in five years for our elected representatives. Why should we not vote for them or reward them for every good work done? This will not only motivate them to work in public interest & earn rewards for themselves but they will also be afraid of losing their image/status in society if they don't do so, because with the help of these new Social points anyone will be able to measure the social standing and character of a person at any point of time which was not possible earlier. Political parties may nominate their representative for elections on the basis of Social points received by them.

Often, we face a situation before granting a loan that when a person does not have money today and collateral to provide but has a good credibility in the market and assures that he will return the money in the future, the person can be judged on the basis of his Social points.

Even if a person acquires Social points using his money, it will be helpful in removing income disparities.

Since these social points are in the form of points and all the information is maintained online, theft of this currency is not possible. The main thing about the Social points is that it will be distributed equally among all & if it is not used within a certain time frame, it will lapse or lose value. These social points cannot be inherited i.e. a person will have to earn it by doing good work and contributing to the wellbeing of others.

In today's times, one of the formalities required during admission of students is that the School, College or institution wants to know how much work they have done for the society. The work will be easier when there would be Social points. The points received will reflect the attitude of the student towards the society and how much he has contributed to the society.

Another advantage is that it will help in eradicating corruption from the society and therefore would force people to work for the society to earn good points for themselves.

This will not only be helpful in reducing the income disparity among different class of persons but will also be useful in knowing the popularity of any person at any point of time on the basis of social points received by him from contributing to the society.

Referring to FIG. 1, an implementation 100 of a system 101 for processing and measuring non-monetary contributions is illustrated, in accordance with an embodiment of the present subject matter.

In one implementation, the system 101 may be connected to the user device 104 through a network 102. It may be understood that the system 101 may be accessed by multiple users through one or more user devices 104-1, 104-2,104-3, collectively referred to as user device 104 hereinafter, or user 104, or applications residing on the user device 104.

In an embodiment, as illustrated in FIG. 1, the system 101 may accept information provided by multiple users 104-1, 104-2,104-3 using the user device 104, to register the respective user with the system.

In an embodiment, though the present subject matter is explained considering that the system 101 is implemented as a server, it may be understood that the system 101 may also be implemented in a variety of user devices, such as but are not limited to, a portable computer, a personal digital assistant, a handheld device, embedded hardware used only for this purpose, a mobile, a laptop computer, a desktop computer, a notebook, a workstation, a mainframe computer, and the like.

In one implementation, the network 102 may be a wireless network, a wired network or a combination thereof. The network 102 can be accessed by the device using wired or wireless network connectivity means including updated communications technology.

Figure 2:
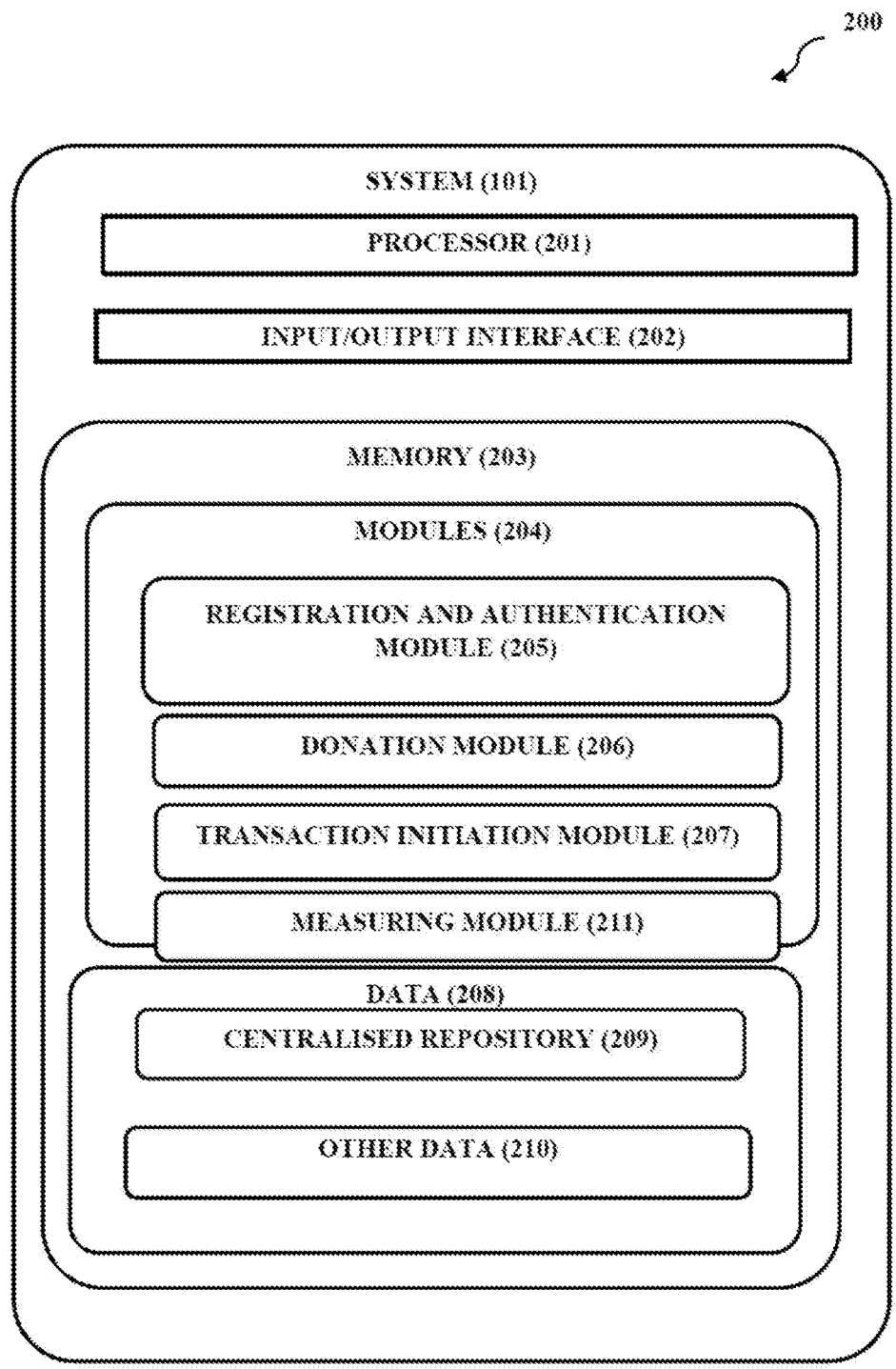
FIG. 2 illustrates, the system 101 and its components, in accordance with an embodiment of a present subject matter.

Referring to FIG. 2, components of the computer implemented system 101, comprises at least one processor 201, an input/output (I/O) interface 202, and a memory 203, modules 204 and a data 208. In one embodiment, the at least one processor 201 is configured to fetch and execute computer-readable instructions stored in the memory 203. In one embodiment, a processor 201, wherein the processor is configured to communicate with user devices via a data communication channel.

In one embodiment, the I/O interface 202 implemented as a mobile application or a web based application may include a variety of software and hardware interfaces, for example, a web interface, a graphical user interface, and the like. The I/O interface 202 may allow the system 101 to interact with the user device 104. Further, the I/O interface 202 may enable the user device 104 to communicate with other computing devices, such as web servers and external data servers (not shown). The I/O interface 202 can facilitate multiple communications within a wide variety of networks and protocol types, including wired networks, for example, LAN, cable, etc., and wireless networks, such as WLAN, cellular, or satellite. The I/O interface 202 may include one or more ports for connecting to another server.

In an implementation, the memory 203 may include any computer-readable medium known in the art including, for example, volatile memory, such as static random-access memory (SRAM) and dynamic random access memory (DRAM), and/or non-volatile memory, such as read only memory (ROM), erasable programmable ROM, flash memories, hard disks, optical disks, and memory cards. The memory 203 may include the modules 204 and the data 208.

In one embodiment, the modules 204 includes routines, programs, objects, components, data structure, databases etc., which performs particular tasks, functions or implement abstract data types. In one implementation, the modules 204 may further include a registration and authentication module 205, a donation module 206 and a measuring module 211.

Now referring to FIG. 2, the registration and authentication module 205 register and authenticate the identity of a user before initiating the transaction, wherein one or more user 104 may be blocked, denied access or be required to reattempt access if the authentication object fails to authenticate the user 104. The authentication module 205 may comprise authentication object such as but not limited to unique user id and password magnetic stripe card, unique identification number, bar code, Quick Response code, biometrics, message authentication codes, one-time password/ single sign on, multi-factor authentication, electronic access card or smart card, security token, keystroke dynamics, biometric authentication, fingerprint recognition, facial recognition, voice pattern, handwritten signature, retina recognition, iris recognition, mutual authentication, hand geometry authentication, Kerberos authentication, CHAP authentication, quantitative authentication or any combination thereof. The registration and authentication module 205 configured to initially issue the non-monetary points to every registered user 104-1,104-2,104-3 using the user device 104.

In one embodiment, the user 104 may have a system to record, send alert or be informed if any other user is accessing the user's restricted access virtual area.

In one embodiment, certain additional system and method may be used along with the present transaction system to prevent or restrict hacking or related phenomenon such as but not limited to phishing, man in the middle track, inside jobs, rogue access points, back door access, use of virus and worms, use of trojans, denial of service attack, sniffing, spoofing, ransom ware or any combination thereof.

In one embodiment, the donation module 206 may collect the parameters from user device 104 and set those parameters for processing and measuring non-monetary contribution of an individual to the society. The parameters may be one or more parameters for promoting the welfare of any living being and on basis of socially acceptable norms. Said parameters may comprise individual's non-monetary contribution in, but not limited to natural calamities, accidents, poverty and slums, disabled people, health conditions, orphans, old age people, animals, sports, science, arts, commerce, industry, labour, victims or any other service and such parameters of situations. In one embodiment, the individual's non-monetary contribution may be in the form of physically helping people or animals or any living thing affected by natural calamities, accidents, physical disability, poverty, poor health conditions and like forms. Based on the said parameters, every individual may be rated by getting donations out of points given to each user by users 104-1, 104-2,104-3 for his non-monetary contribution to the society, wherein the system 101 enables such rating to individuals. Said rating may be performed in a form of rendering non-monetary points.

In one embodiment, an information used for the purpose of making transaction may be partially or entirely virtual data. Virtual data may comprise either of a data, information, a program, a software, or a code which may be storable, accessible or convertible in an electronic format.

In one embodiment, the transaction initiation module 207 may be configured to initially issue the non-monetary points to every registered user 104-1,104-2,104-3 using the user device 104. The transaction between plurality of user devices 104 may take place if the transaction satisfies the parameter conditions set by the system 101 with the help of parameters, wherein the conditions may be acknowledging the parameters defined in donation module 206. The transaction may be performed by rendering a point from the issued points to the registered user 104-1,104-2,104-3 using the user device 104. In one embodiment, the issued points may lapse after a predefined time interval if not used.

In one embodiment, a measuring module 211 may be configured to measure or calculate the points received by registered user 104-1,104-2,104-3 using the user device 104. Such measuring may be conducted after predefined time intervals by the measuring module 211.

In one embodiment, the parameters may be stored in a centralized repository 209, which may be further retrieved. Further, the measured points of every registered users 104-1,104-2,104-3 using the user device 104 may be dynamically stored in the other data 210.

Figure 3:
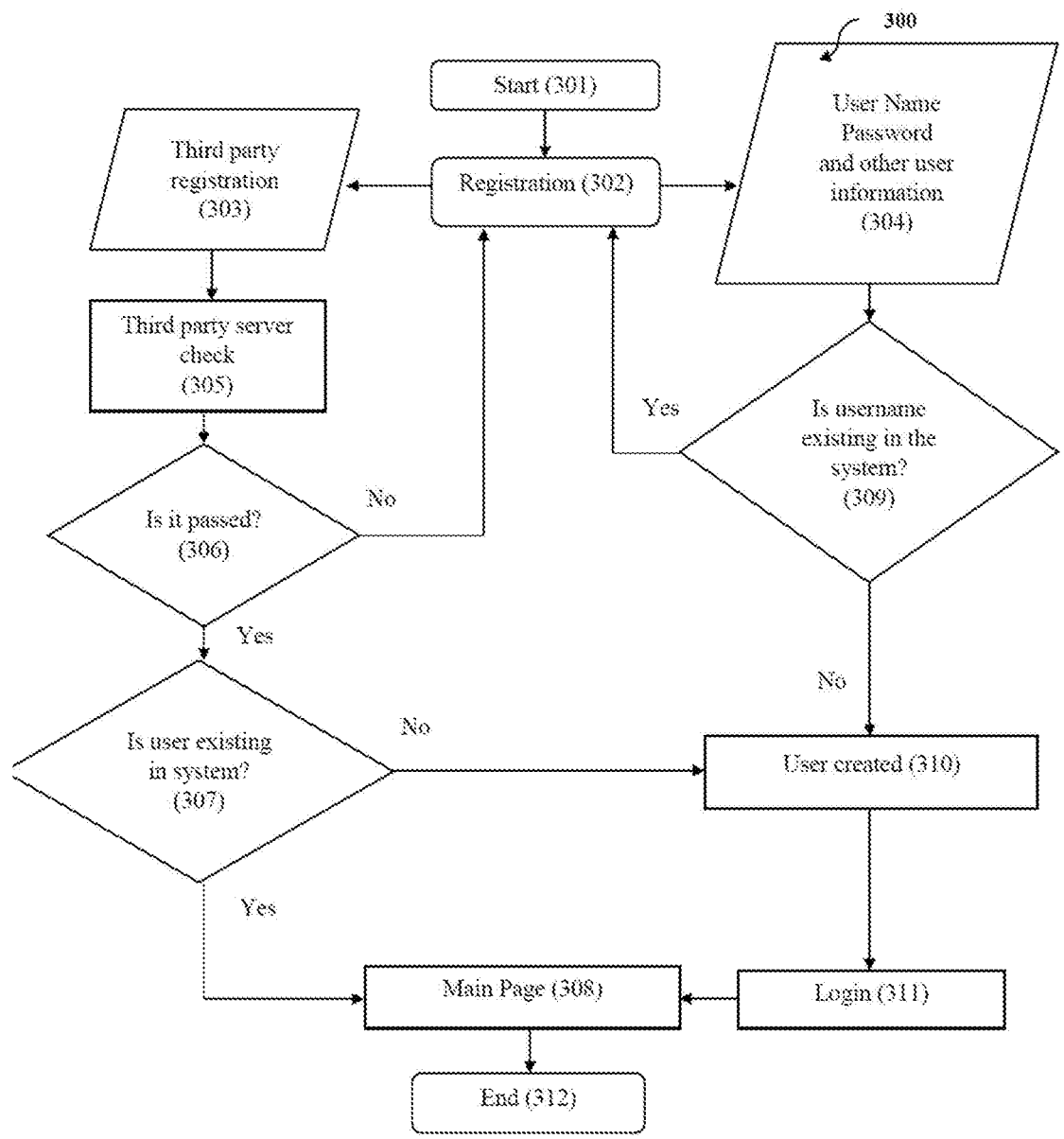
FIG. 3 illustrates, a flowchart 300 for depicting a user flow.

Referring now to FIG. 3, a flowchart 300 for depicting a user flow is illustrated in accordance with the present subject matter. At step 301, the process is initiated.

At step 302, registration of the user 104-1,104-2,104-3 using the user device 104 may be performed. In one embodiment, the users 104-1,104-2,104-3 using the user device 104 may be registered with the system 101. Said registration 302 may permit rendering of points between the registered user 104-1,104-2,104-3 using the user device 104.

At step 303, third party registration may be performed. In one embodiment, third party registration 303 may be configured to register the user 104-1,104-2,104-3 using the user device 104 depending on whether the user 104-1,104-2, 104-3 using the user device 104 may already be registered with a social website or like platforms.

At step 305, third party server check may be performed. In one embodiment, checking of third party server may be performed by the processor 201 of the system 101, wherein the checking may include to cross check whether the user 104-1,104-2,104-3 using the user device 104 may be already registered with one or more social websites or computer implemented platforms.

At step 306, passing condition may be checked. In one embodiment, at step 306, the input received from the step 305 may be verified for passing the necessary criteria such as user 104-1,104-2,104-3 using the user device 104 is registered with one or more social websites or computer implemented platform. If the necessary criteria are passed, then a user existence in the system 101 may be checked at step 307. If the necessary criteria are not passed, then the process may be redirected to registration step 302.

Further, at step 307, if the user 104-1,104-2,104-3 may already exist in the system 101, then the processor 201 directs said user 104-1,104-2,104-3 with user device 104 to main page at step 308, on verifying the user existence on social websites. If the user 104-1,104-2,104-3 using user device 104 may not be existing in the system 101, then a user 104-1,104-2,104-3 using user device 104 may be created in the system 101 at step 310.

In one embodiment, the registration at step 302, may be performed by providing relevant information.

At step 304, the registration may be conducted by inputting relevant information such as user name, password and other user information.

At step 309, existence of the user name may be checked. In one embodiment, at step 309, the processor 201 may check whether the username is already existing in the system 101. Username should be unique for each user. If the user name exists in the system 101, the process may be redirected to the registration step 302 with the message "User is already existing with that username please enter another username.". If the user name may not exist in the system 101, then the user may be created at step 310.

At step 311, after user creation at step 310, the processor 201 may direct the system 101 to the login menu or page.

Further, at step 308, after the login process at step 311, the processor 201 may direct said user 104-1,104-2,104-3 with user device 104 to main page at step 308.

At step 312, the user flow process may be ended.

Figure 4A:
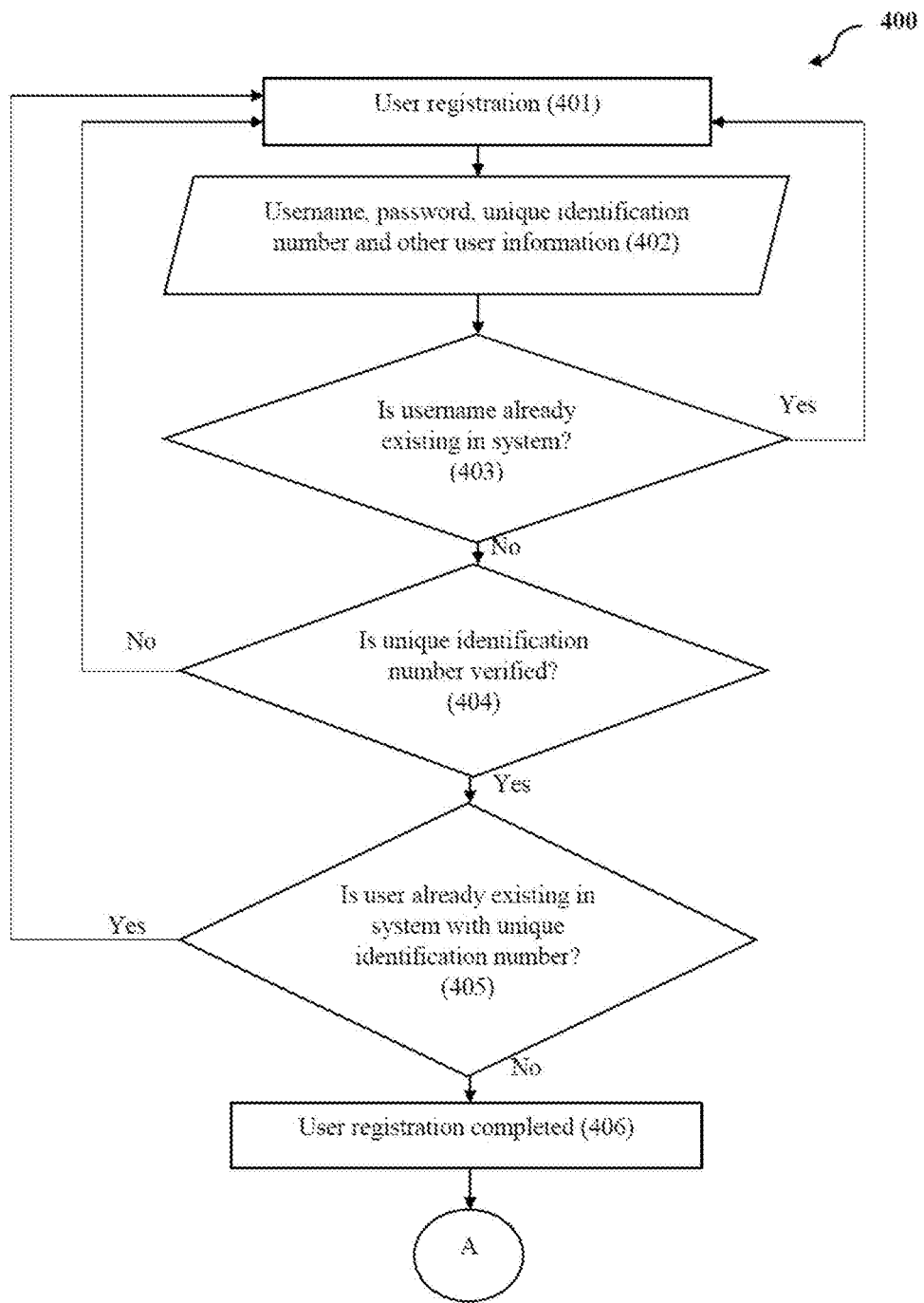
FIG. 4 illustrates, a flowchart 400 for registration, authentication and session creation.
Figure 4B:
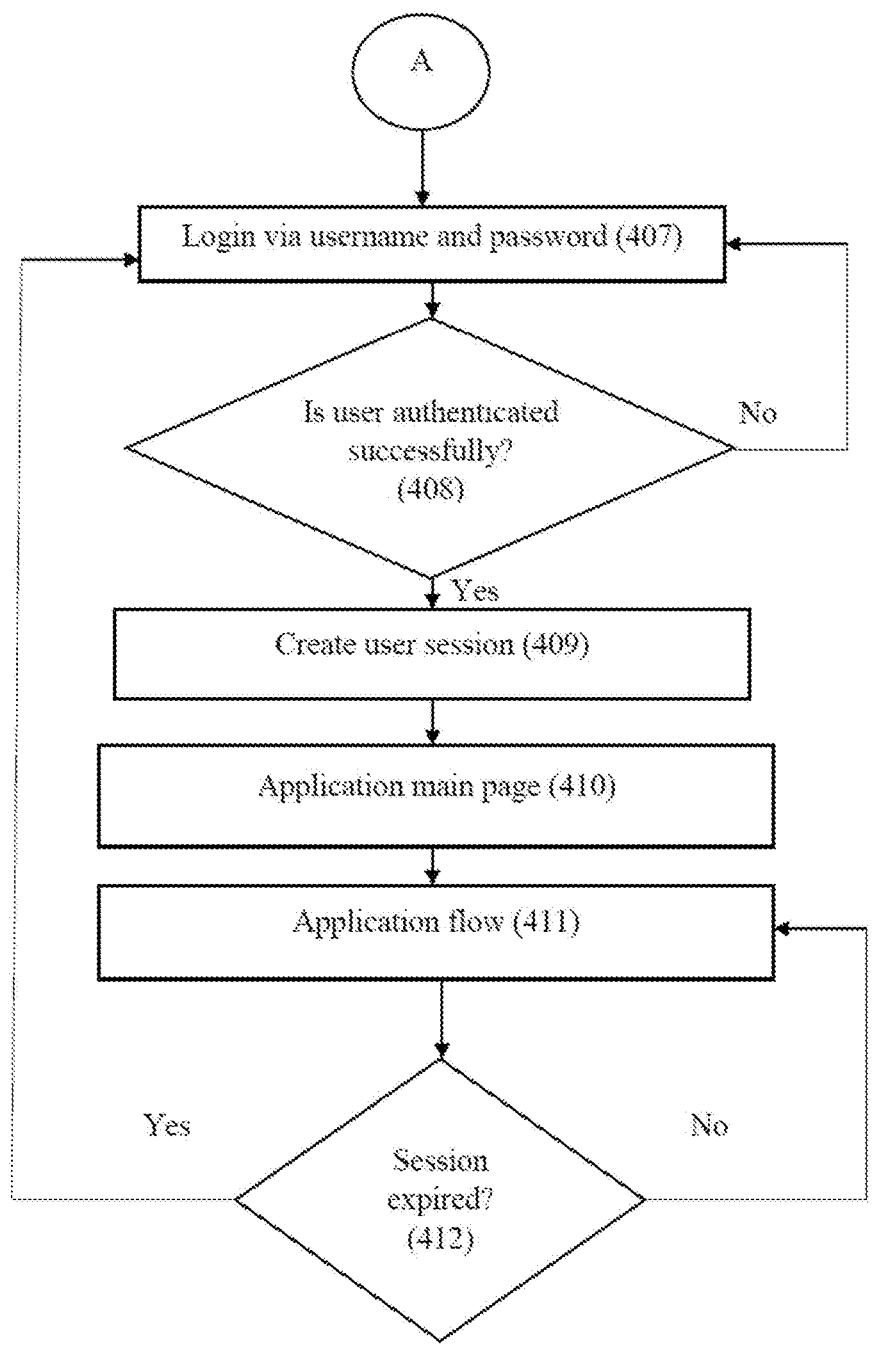

Referring now to FIG. 4, a flowchart 400 for registration, authentication and session creation is illustrated in accordance with the present subject matter. At step 401, user registration may be initiated.

At step 402, user name, password, unique identification number and other relevant information may be inputted in the system 101. In one embodiment, the unique identification number may be a unique government issued identifier (for example, the Aadhaar number/UIDAI number issued by the Government of India) or any other unique identifier.

At step 403, existence of the user name in the system 101 may be verified. In one embodiment, if the username already exists in the system 101, the process is redirected to step 401 of user registration for entering unique username in the system 101. If the username may not be existing in the system 101, the process is directed to step 404.

At step 404, verification of unique identification number may be performed. In one embodiment, if the unique identification number is not verified, then the process is redirected to step 401 for verification of unique identification number by the third party server. If the unique identification number is verified, then the process is directed to step 405.

At step 405, user existence with unique identification number may be checked. In one embodiment, if the user already exists in the system 101 with unique identification number, then the process may be directed to step 401 of registration as more than one user cannot be created with same unique identification number. If user with unique identification number does not exist in the system 101, then the user registration may be completed at step 406.

In one embodiment, after completion of user registration, the user 104-1,104-2,104-3 with user device 104 may be configured to login to the system 101 by entering registered user name and password at step 407.

At step 408, user authentication may be verified. In one embodiment, successful user authentication may be verified. If the user authentication may not be successful, then the process is redirected to step 407. If the user authentication is successful, then the user may be directed to step 409.

At step 409, user session may be created. In one embodiment, the user session may be created via processor 201 in order to enable the user 104-1,104-2,104-3 with user device 104 to perform defining of parameters and initiate transaction with the help of donation module 206.

At step 410, the processor 201 may direct the process to application main page. In one embodiment, the user 104-1, 104-2,104-3 with user device 104 may be directed to application main page. In the said page, the processor 201 may be configured to take inputs of parameters and initiate transaction with the help of donation module 206 and transaction initiation module 207. In one embodiment, the processor 201 at the said step 410 may display the issued points, left points, donated points or such like categories to each registered user 104-1,104-2,104-3 with user device 104.

At step 411, the application flow may be processed. In one embodiment, at step 411, the application flow may be configured to perform transaction and measurement of the points.

At step 412, expiry of session may be checked. In one embodiment, if the session may not be expired then the step 411 may be continuously performed. If the session is expired, the process is redirected to 407, for directing the processor 201, to login the user 104-1,104-2,104-3 with user device 104 again.

Figure 5:
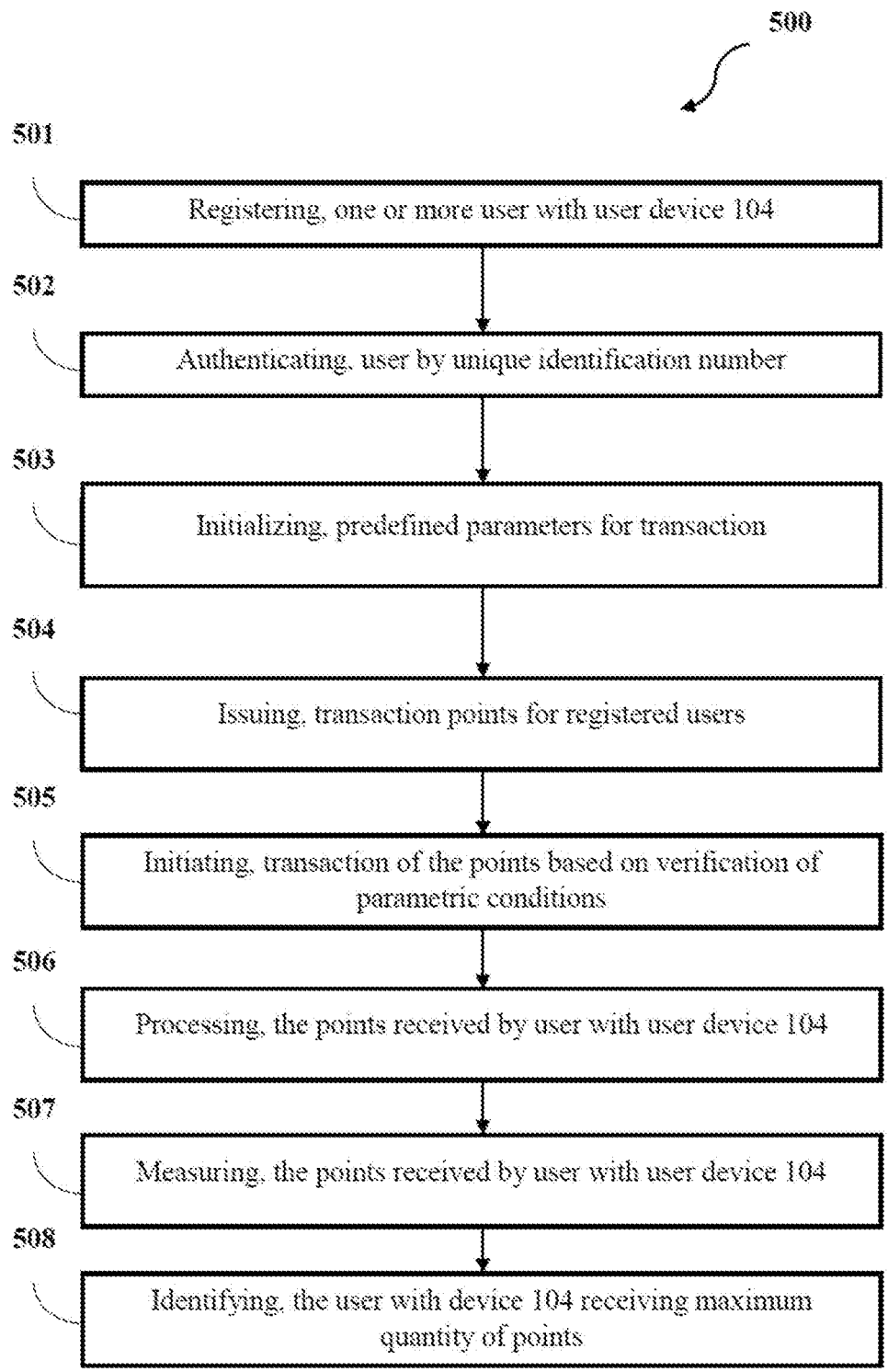
FIG. 5, illustrates method 500 for processing and measuring non-monetary contributions FIG. 6 illustrate a deployment architecture of an embodiment of the invention.

Referring to FIG. 5, a method 500 for processing and measuring non-monetary contributions is illustrated with respect to the present subject matter. Basically, the system 101 may be configured to process and measure the non-monetary contribution of an individual in the society, by issuing and transacting non-monetary points. Said non-monetary points when measured in entirety may result in identifying the user using user device 104 receiving maximum quantity of said points. The identification may enable to recognize an individual's genuine non-monetary contribution in the society. As the said points are non-monetary in nature, measuring such points may render accurate social contribution of an individual in the society for social causes. Said points may also resemble individual's social performance in the society without expecting any reward. Said system may bring uniformity in identifying accurate and unbiased individual's social and non-monetary contribution in the society.

At step 501, registering of one or more users with user device 104 may be performed. In one embodiment, the processor 201 may register one or more user with user device 104 in the system 101 as per the flowchart 300. The registration process is necessary as only the user with user device 104 registered in the system 101 may be configured to transact said points.

At step 502, authentication of the user may be performed. In one embodiment, said authentication may be performed via processor 201 with the help of unique identification number. The user with user device 104 may be authenticated and registered in the system by inputting relevant unique identification number. Every user with user device 104 should have unique identification number. Said authentication may enable registering authenticated and genuine user with user device 104. In one embodiment, the unique identification number may comprise a unique government issued identifier (for example, the Aadhaar number/UIDAI number issued by the Government of India) or any other unique identification number. Said authentication and registration may be performed with the help of registration and authentication module 205.

At step 503, initialization of predefined parameters may be performed. In one embodiment, to identify individual's social contribution, the parameters for rating the individual may be initialized by the processor 201. Said parameters may define all type of social and non-monetary contribution an individual may be able to do for the society.

In one embodiment, the user with user device 104 may be able to access parameters such as a content specific data related to social activities being carried out in the society by individuals in the society with the help of system 101. In an exemplary embodiment, the user with user device 104 may be able to access content based on user preferences/user location/user interest. Said content may be available in two modes. In one embodiment, in the first mode, the social activities of individuals may be promoted via user device 104. Said promotion may be performed by sharing via user device 104, said activities via text, video, images, GIF's (Graphics Interchange Format) or any other form of multimedia or format that may be acceptable by the system 101. In the said embodiment, the processor 201 of the system 101 may be configured to accept said promoting inputs from individual user device 104.

In another embodiment, in the second mode, the system 101 may be configured to generate said promoting content via usage of "bots", wherein bots may be virtual robots. In one embodiment, the bots may be generated through machine learning wherein patterns of said content may be derived and further said patterns may be processed in order to match the outputs with the format available on internet. The system 101 may be configured to release said virtual bots in order to collect information, data, content related to social activities done by people and shared on various forums, e-newspapers, or such similar social networks/portals wherein, said content of social activities may not be available on system 101.

Therefore, the system 101 may be configured to generate parameters such as content specific data, in one embodiment via user inputs from user device 104 or in the second embodiment, vis the system 101 itself via generating and utilization of virtual bots.

Said parameters may be defined with the help of donation module 206. In one embodiment, said parameters may be stored statically or dynamically in the central repository 209.

At step 504, issuance of points for transaction may be performed. In one embodiment, every registered user with user device 104 may be issued predefined number and nature of points by the processor 201. Said points may be issued, in order to transact the points to other user with user device 104 if social and non-monetary contribution of the user with user device 104 may be identified. Said points may be issued by the processor 201 soon after registration and authentication process. Said points may be valid for fixed time interval as defined in the system 101. The points may lapse in case not used for transacting within the predefined fixed time interval.

At step 505, initiation of transaction of points may be performed. In one embodiment, transaction between the user with user device 104 may be initiated by the processor 201. The processor 201 may perform the said transaction on verification of parametric conditions defined in the parameter module 206. Said verification may be performed by identifying the authentication of parametric conditions such as posts on the system 101. The user with user device 104 may transact one or more points via processor 201 on identification and authentication of parametric conditions of one or more other user with user device 104.

At step 506, processing of points received by the user device 104 may be performed. In one embodiment, the processor 201 may process the points received by the user with the user device 104.

At step 507, measuring of the received points may be done. In one embodiment, the processor 201 may be configured to measure the points received by user with user device 104. Said measurement process may comprise measuring of the points received by the user with user device 104. The calculation process may comprise aggregation of such points received by the user. The points issued to the user may not be included in said calculation and measurement. Only the points received by each user with device 104 may be aggregated in the process of said measurement. In one embodiment, said aggregation of points may be conducted after a predefined time interval in a uniform manner.

At step 508, identification of the user with user device 104 receiving maximum quantity of points under predefined categories may be performed. In one embodiment, a central system may be configured to receive the measurement result from step 507 and identify which user with user device 104 may have received maximum quantity of points in predefined time duration.

The implementation 100 may be configured to result in accurate processing and calculation of non-monetary points received by user with user device 104 for non-monetary social contribution in the society. Said system may be beneficial while electing any candidate during election, or any selection procedure depending on his non-monetary social contribution in the society.

In a specific embodiment, bots associated with the social network may be configured to collect information regarding activities corresponding to or implemented by members of the social network. Responsive to determining that information regarding such activities is unavailable on the member's account in the social network, the social network may be configured to post descriptors of such activity or activities on the social network. Any such information extracted thorough bots and posted on the social network may thereafter be treated just like any other member posts, and other members may choose to donate or transfer units of electronic tokens to the member whose activities have been posted.

In other embodiments, bots may be configured to extract information regarding occurrences, events or social causes that are not associated with members of the social network, and to post such information on the network, to enable members to provide assistance as necessary. In an embodiment, obtaining and posting information may include ascertaining geo-tag information associated with such events, occurrences or social causes so that members in the vicinity can respond. In a particular embodiment, the social network may be configured to alert members located in the geographical vicinity of an event, occurrence or social cause, so that such members may respond appropriately. In another embodiment, the social network may be configured to ascertain the veracity of a member's posts by comparing the location of activities referred to in the post with GPS location information received from a mobile communication device associated with the member (e.g. from a registered mobile phone device of the member).

In another embodiment, the social network may be configured so as to provide a verification counter associated with each member post or with any information or data provided by a member. The social network may be configured to allow members other than the posting member to provide input representing their individual verification or validation of the information provided by the posting member—wherein receiving said input results in incrementing the verification counter by a predefined value. The verification counter may be visible or accessible to all members of the social network—thereby enabling other members to ascertain whether the information or data posted by a member has been independently verified or validated by third parties, and to additionally the assess the number of third parties that have verified or validated said information.

In addition to the above, a social network in accordance with the present invention may include one or more of the following:

trending logics—members of the social network may be presented with information or data that is selected based on member preferences or based on the member's history of surfing data or information on the network;

social blogs—the social network may be configured to enable members to post their social stories/blogs on the social network, and to display advertisements on the member's homepage/blog page. Any revenue received through ads may be shared by the social network and the member in a predefined proportion;

cryptocurrency based implementations—in one or more embodiments of the present invention, one or both of the first and second type of electronic tokens may be cryptocurrency tokens implemented through a blockchain or distributed ledger system. In an embodiment, the value of such currency would be decided by the market forces and the number of times such currency is being traded between members. In a more specific embodiment, the system may include a method of converting units of electronic tokens that are not cryptocurrency based, into units of electronic tokens that are cryptocurrency based, on satisfaction of one or more predefined criteria—for example, on a member achieving 'x' units of a particular type of electronic tokens;

Corporate Social Responsibility module—The social network may include a corporate social responsibility module wherein companies may register on the social network and can directly contribute to causes that they wish to support or members of the network whose activities that they wish to support. In an embodiment, the companies may decide which members to support, by assessing the peer approval ratings of each member, based on the units of electronic tokens of the second type that are associated with the account of said member;

payment wallet—The social network may additionally include a payment wallet for accumulating and/or transferring one or more of the first and second type of electronic tokens. By way of example, a payment wallet may enable a company/user to send money to another user/company directly i.e. by visiting their profile. In an embodiment of the invention, the payment wallet may additionally be configured to enable donation or transfer of any of a government recognized currency, virtual currency, electronic currency, or currency credit, or a cryptocurrency from a member's wallet to an intended recipient. In an embodiment, implementation of the payment wallet enables implementation of a crowdfunding model.;

variable conversion rate between units of first and second type electronic tokens—The social network may in an embodiment permit for configurable rules that govern conversion rates for units of the first type of electronic tokens to units of the second type of electronic tokens. In an embodiment, conversion rates implemented for transfers or donations between unrelated members may be higher than conversion rates for transfers or donations between members who are friends, affiliates or relatives. Friends, relatives and affiliates may be identified through bots i.e. bots may identify relatives by analysing member data extracted from the internet and from different social networks/portals and coming up with a solution. For example, once a pair of relatives is identified, any units of electronic tokens of the first type that are transferred between said pair of relatives would be discounted at certain rate—e.g. donation of 500 units of the first type of electronic token would result in receipt of only 450 units of the second type of electronic token in the recipient account;

share member history/record—in an embodiment, the social network may be configured to verify the background of any member registered on the network through databases of criminal records and bank defaulters. This would verify the credibility and genuineness of that particular user. The social network may in an embodiment be configured to apply specific discounting rules to units of electronic tokens transferred into member accounts of members who have been identified as having a history or record that conforms to one or more predefined history parameters. For example, in an embodiment, any units of electronic tokens transferred to a member with a criminal record may be discounted at a certain rate (10%).

Figure 6:
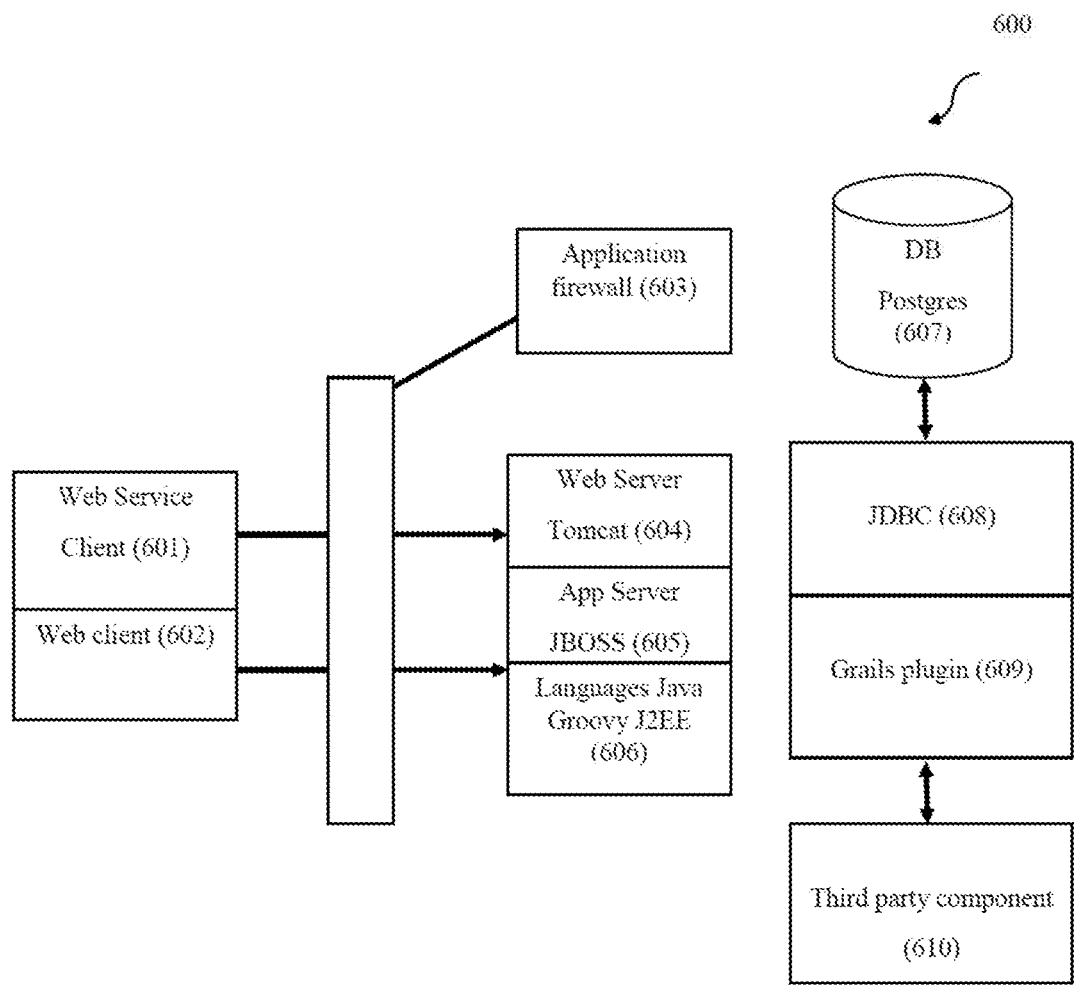

Referring now to FIG. 6, a system 600 based deployment architecture of application is illustrated in accordance with the present subject matter. In one embodiment, web service client 601 may provide an interface to consume external web services for third party integration. Said web service client 601 may not only focus on integrating web service operations as Rules actions, but may also be used as data provider for other modules. In one embodiment, web service client 601 may come with a user interface that allows site administrators to create REST and SOAP service descriptions with their respective operations and data types. Those service descriptions may be edited, cloned and deleted as well as imported/exported for sharing with other sites.

In one embodiment, web client 602 may be an application (e.g. Internet Explorer, Firefox, Chrome, Safari, Opera) running on a local device (desktop, notebook, cell phone) used to interact mainly with web servers even though the user 104 may use one's web client 602 to access servers running protocols others than HTTP and HTTPS.

An application firewall 603 may be a form of firewall that controls input, output, and/or access from, to, or by an application or service. Said firewall 603 may operate by monitoring and potentially blocking the input, output, or system service calls that do not meet the configured policy of the firewall 603.

A web server (604) may be a computer system that processes requests via HTTP, the basic network protocol used to distribute information on the World Wide Web. The term may refer to the entire system, or specifically to the software that accepts and supervises the HTTP requests. Apache Tomcat is a web container which allows to run servlet and JavaServer Pages (JSP) based web applications. Most of the modern Java web frameworks are based on servlets.

An application server 605 may expose business logic to client applications through various protocols, possibly including HTTP. While a web server 604 mainly deals with sending HTML for display in a web browser, an application server 605 may provide access to business logic for use by client application programs.

In one embodiment, Java and Groovy may be object-oriented programming languages 606 for the Java platform. Groovy is a powerful, optionally typed and dynamic language, with static-typing and static compilation capabilities. Said languages 606 may integrate smoothly with any Java program, and immediately deliver to the application plurality of powerful features, including scripting capabilities, domain-specific language authoring, runtime and compile-time meta-programming and functional programming.

In one embodiment, JDBC stands for Java Database Connectivity 608, which is a standard Java API for database-independent connectivity between the Java programming language and a wide range of databases.

Figure 7:
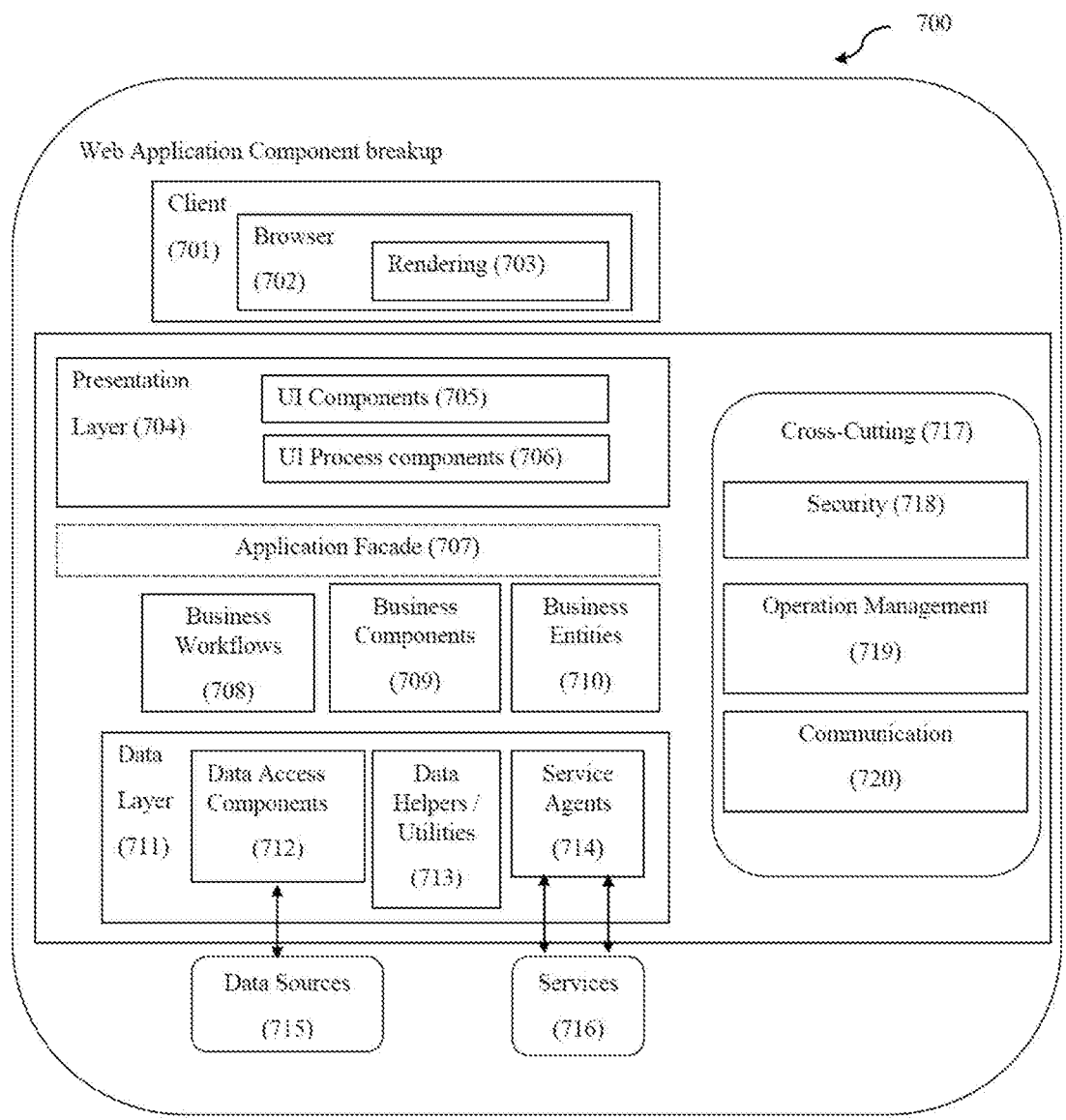
FIG. 7 illustrates an architecture of a web application deployed in connection with the present invention.

Referring now to FIG. 7, illustrates a three-tier architecture 700 of the web application in accordance with the present subject matter. The three-tier architecture 700 may be a client-server software architecture pattern in which the user interface (presentation), functional process logic ("business rules"), computer data storage and data access may be developed and maintained as independent modules, most often on separate platforms.

In one embodiment, web browsers and web servers function together as a client-server system 701.

In computer networking, client-server 701 is a standard method for designing applications where data may be kept in central locations (server computers) and efficiently shared with any number of other computers (the clients) on request. All web browsers function as clients that request information from websites (servers).

In one embodiment, the presentation layer 704 may be configured to be responsible for presentation and user interaction as a capability with the first-tier components. The client components 705, 706 enable the user to interact with the second-tier processes in a secure and intuitive manner. WebSphere Application Server supports several client types. Client 701 may not access the third-tier services directly.

The second-tier processes are commonly referred to as the application logic layer. These processes manage the business logic of the application, and may have permitted access to the third-tier services. The application logic layer 707 may be where most of the processing work may occur. Multiple client components may access the second-tier processes simultaneously, hence the application logic layer 707 may manage its own transactions.

The third-tier services may be protected from direct access by the client components residing within a secure network. Interaction may occur through the second-tier processes.

All three tiers may communicate with each other. Open, standard protocols and exposed APIs simplify said communication. User with user devices 104-1, 104-2, 104-3 may enable writing on the client components 701 in any programming language, such as Java. These clients 701 may run on any operating system, by speaking with the application logic layer 707. Databases in the data layer 711 may be of any design, if the application layer 707 may query and manipulate them. The key to this architecture is the application logic layer 707.

Figure 8:
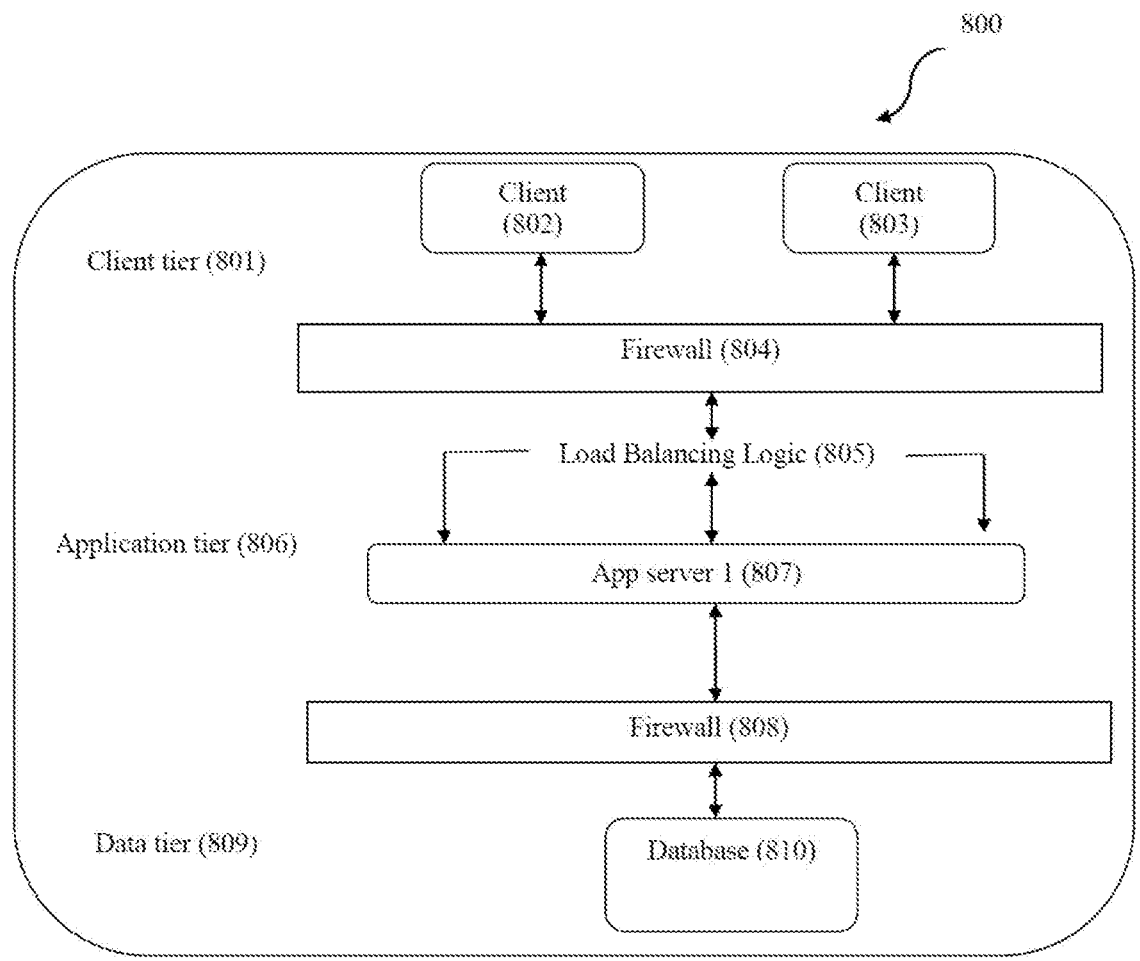
FIG. 8 illustrates a load balancing system for implementation in accordance with teachings of the present invention.

Referring now to FIG. 8, a flow diagram 800 illustrates a load balancing at App Server in accordance with the present subject matter. Basically, load balancing refers to efficiently distributing incoming network traffic across a group of backend servers, also known as a server farm or server pool.

Modern high-traffic websites may serve hundreds of thousands, if not millions, of concurrent requests from users or clients 802, 803 and return the correct text, images, video, or application data, all in a fast and reliable manner. To cost-effectively scale to meet these high volumes, modern computing best practice generally requires adding more servers.

A load balancer 805 may act as the "traffic cop" sitting in front of user servers 807 and routing client may request across all servers capable of fulfilling those requests in a manner that maximizes speed and capacity utilization and ensures that no one server is overworked, which could degrade performance. If a single server fails, the load balancer 805 may redirect the traffic to the remaining online servers. When a new server may be added to the server group, the load balancer 805 automatically may start to send requests to it.

A load balancer 805 may perform the following functions:
distributes client requests or network load efficiently across multiple servers;
ensures high availability and reliability by sending requests only to servers that are online;
provides the flexibility to add or subtract servers as demand dictates.

Figure 9:
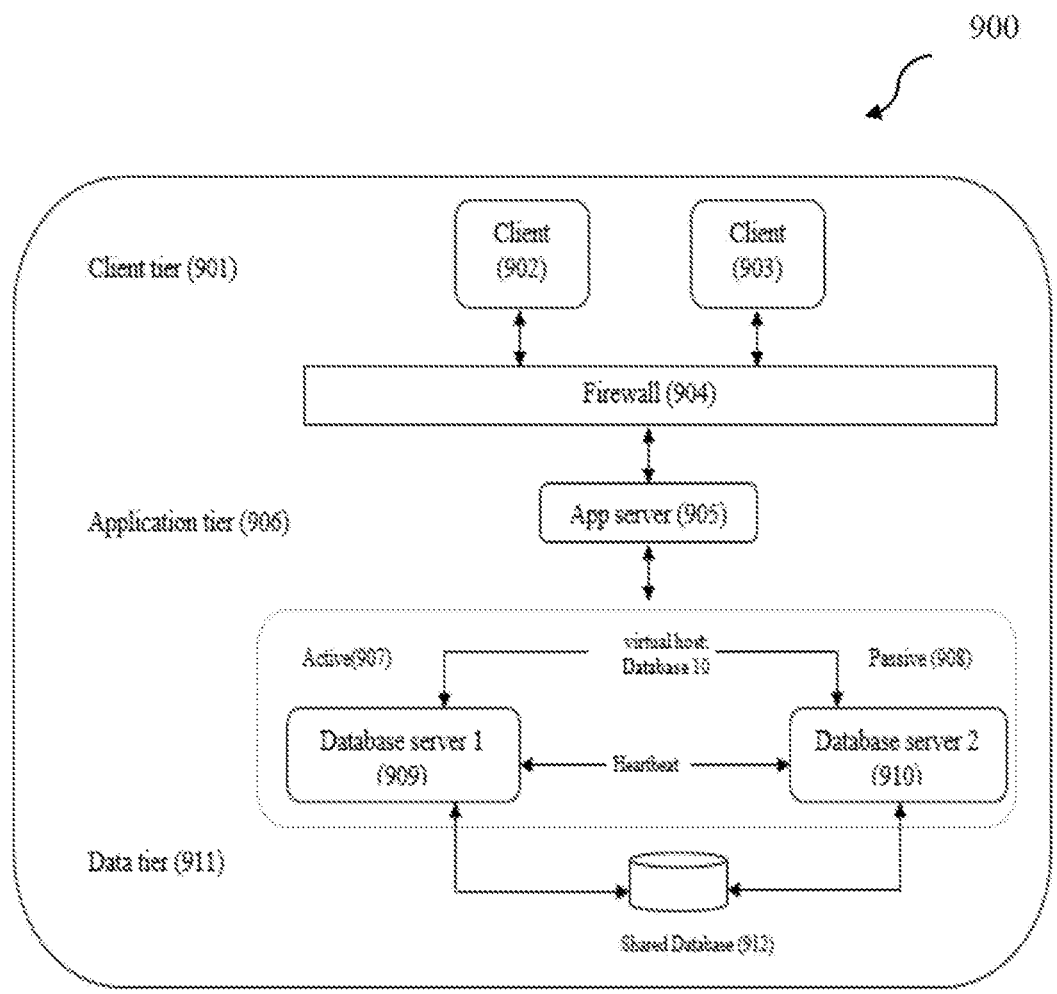
FIG. 9 illustrates load balancing at a data tier level in accordance with teachings of the present invention.

Referring now to FIG. 9, a flow diagram 900 for load balancing at data tier is illustrated in accordance with the present subject matter. In one embodiment, a database server farm should be load balanced not only on the basis of the states of the servers, but also on the basis of the availability of the database on each server 909, 910. A service might be up, and a load balancing device may show said service as being in the UP state, but the requested database might be unavailable on that service. If a query may be forwarded to a service on which the database may be unavailable, the request is not served. Therefore, a load balancing device may be aware of the availability of a database on each service 909, 910 and, when making a load balancing decision, it may consider only those services on which the database is available.

In a preferred embodiment, consider that database servers server 1, server 2, and server 3 host databases mydatabase1 and mydatabase2. If mydatabase1 becomes unavailable on server2, the load balancing device must be aware of that change in state, and it must load balance requests for mydatabase1 across only server1 and server3. After mydatabase1 becomes available on server 2, the load balancing device must include server2 in load balancing decisions. Similarly, if mydatabase2 becomes unavailable on server3, the device must load balance requests for mydatabase2 across only server1 and server2, and it must include server3 in its load balancing decisions only when mydatabase2 becomes available. This load balancing behavior must be consistent across all the databases that are hosted on the server farm.

Although implementations of a system and method for processing and measuring non-monetary contributions have been described in language specific to structural features and/or methods, it is to be understood that the appended claims are not necessarily limited to the specific features or methods described. Rather, the specific features are disclosed as examples of a system and method for processing and measuring non-monetary contributions.

What is claimed is:

1. A system for peer review based transfer of electronic tokens within a social network, the system comprising:
a processor implemented social network comprising a first database and a second database, wherein the first database and the second database are configured to maintain a first type of electronic token account and a second type electronic token account, respectively, corresponding to each of a plurality of members of said social network;
wherein the first database and the second database are configured to maintain records of electronic tokens associated with the first type electronic token account and the second type of electronic token account, respectively corresponding to each of the plurality of members of said social network;
wherein the first type electronic token account records a number of units of a first type electronic token associated with each of the plurality of members, wherein the first type electronic token account corresponding to each of the plurality of members of said social network is allocated a fixed and equal number of units of the first type electronic token having equal value on a periodic basis, said allocated units of said first type electronic token having a defined expiry period;
the second type electronic token account records a number of units of a second type electronic token associated with each of the plurality of members, wherein each of the second type electronic tokens is a non-transferable token and having a lifetime validity period, and
wherein each of the second type electronic tokens is generated through a process of transfer comprising:
debiting from a transferor first type electronic token account, one or more first type electronic tokens that are associated with said transferor first type electronic token account;
generating equivalent number of units of the second type electronic tokens based upon the debiting from a transferor first type electronic token account one or more first type electronic tokens that are associated with said transferor first type electronic token account; and
crediting the generated second type electronic tokens into a transferee second type electronic token account identified by a member associated with the transferor first type electronic token account;
responding to successful user authentication of a second member of the plurality of members of said social network based on username information and password information transmitted from a user device to the processor implemented social network, by implementing the steps of:
establishing a user session between the processor implemented social network and the user device;
directing the user device to an application webpage;
displaying on the user device, information representing the number of units of the first type of electronic token available to the second member;
enabling the user device to access content data comprising of a first set of content data and a second set of content data related to one or more members of the plurality of members of said social network,
wherein the first set of content data has been obtained by the social network from the one or more of the plurality of members of the said social network via their respective user devices, and
wherein
obtaining the second set of content data comprises:

generating the ML OR Al based bots by deriving patterns of said first set of content data and processing the patterns in order to match the outputs of the first set of content data with the format available on the internet;

wherein the format is selected from a group comprising text, video, images, GIF's (Graphics Interchange Format) and any other form of multimedia or format;

collecting by the ML or Al based bots said second set of content data from information shared on various forums, e-newspapers, or such similar social networks/portals and similar social networking portals regarding social activities corresponding to or implemented by said one or more members of the social network;

verifying or validating the content data based upon an input provided by one or more other members or third parties, wherein the input is provided via a verification counter associated with the content data;

receiving from the user device, prior to expiry of the user session, an instruction for transfer of a number of units of the first type electronic tokens from the first type electronic token account associated with the second member;

crediting into the second type electronic token account associated with the first member, a number of units of the second type electronic tokens equivalent to the number of the first type electronic tokens transferred from the first type electronic token account associated with the second member;

debiting from the first type electronic token account associated with the second member, the number of units of the first type electronic tokens transferred from the first type electronic token account associated with the second member; and maintaining a record of the second type electronic tokens received by the first member, and the specific activity or post for which the second type electronic token is received in the second database.

2. The system as claimed in claim 1, wherein the second type electronic tokens comprise tokens of a social currency.

3. The system as claimed in claim 1, wherein the processor implemented social network is configured to determine whether the first set of content data regarding social activities is available on the member's account in the processor implemented social network, wherein if the first set of content data regarding social activity is not available on the member's account in the processor implemented social network, then converting the second set of content data collected by the ML or AI based bots into post descriptors of social activity or activities in a format compatible on the processor implemented social network.

4. A method for implementing a peer review based transfer of electronic tokens within a social network, the method comprising:

maintaining a first type electronic token account and a second type electronic token account in a first database and a second database, respectively, corresponding to each of a plurality of members of the social network, wherein:

the first type electronic token account records a number of units of a first type electronic token associated with each of the plurality of members, wherein the first type electronic token account corresponding to each of the plurality of members of said social network is allocated a fixed and equal number of units of the first type electronic token having equal value on a periodic basis, said allocated units of said first type electronic token having a defined expiry period;

the second type electronic token account records a number of units of a second type electronic token associated with each of the plurality of members, wherein each of the second type electronic tokens is a non-transferable token and having a lifetime validity period, and wherein each of the second type electronic tokens is generated through a process of transfer comprising:

debiting from a transferor first type electronic token account, one or more first type electronic tokens that are associated with said transferor first type electronic token account;

generating equivalent number of units of the second type electronic tokens based upon the debiting from a transferor first type electronic token account one or more first type electronic tokens that are associated with said transferor first type electronic token account, and crediting the generated second type electronic tokens into a transferee second type electronic token account identified by a member associated with the transferor first type electronic token account;

responding to successful user authentication of a second member of the plurality of members of the social network based on username information and password information transmitted from a user device to the processor implemented social network, by implementing the steps of:

establishing a user session between the processor implemented social network and the user device;

directing the user device to an application webpage;

displaying on the user device, information representing the number of units of the first type of electronic token available to the second member;

enabling the user device to access content data comprising of a first set of content data and a second set of content data related to one or more members of the plurality of members of the social network, wherein the first set of content data has been obtained by the social network from the one or more of the plurality of members of the said social network via respective user devices, and wherein the second set of content data has been obtained by the social network from other electronic networks through machine learning (ML) or Artificial intelligence (AI) based bots, wherein obtaining the second set of content data comprises:

generating the ML OR Al based bots by deriving patterns of said first set of content data and processing the patterns in order to match the outputs of the first set of content data with the format available on the internet;

wherein the format is selected from a group comprising text, video, images, GIF's (Graphics Interchange Format) and any other form of multimedia or format;

collecting by the ML or AI based bots said second set of content data from information shared on various forums, e-newspapers, or such similar social networks/portals and similar social networking portals regarding social activities corresponding to or implemented by said one or more members of the social network;

verifying or validating the content data based upon an input provided by one or more other members or third parties, wherein the input is provided via a verification counter associated with the content data;

receiving from the user device, prior to expiry of the user session, an instruction for transfer of a number of units of the first type electronic tokens from the first type electronic token account associated with the second member;

crediting into the second type electronic token account associated with the first member, a number of units of the second type electronic tokens equivalent to the number of the first type electronic tokens transferred from the first type electronic token account associated with the second member;

debiting from the first type electronic token account associated with the second member, the number of units of the first type electronic tokens transferred from the first type electronic token account associated with the second member; and maintaining a record of the second type electronic tokens received by the first member, and the specific activity or post for which the second type electronic token is received in the second database.

5. The method as claimed in claim 4, wherein the second type electronic tokens comprise tokens of a social currency.

* * * * *